Figure 1:
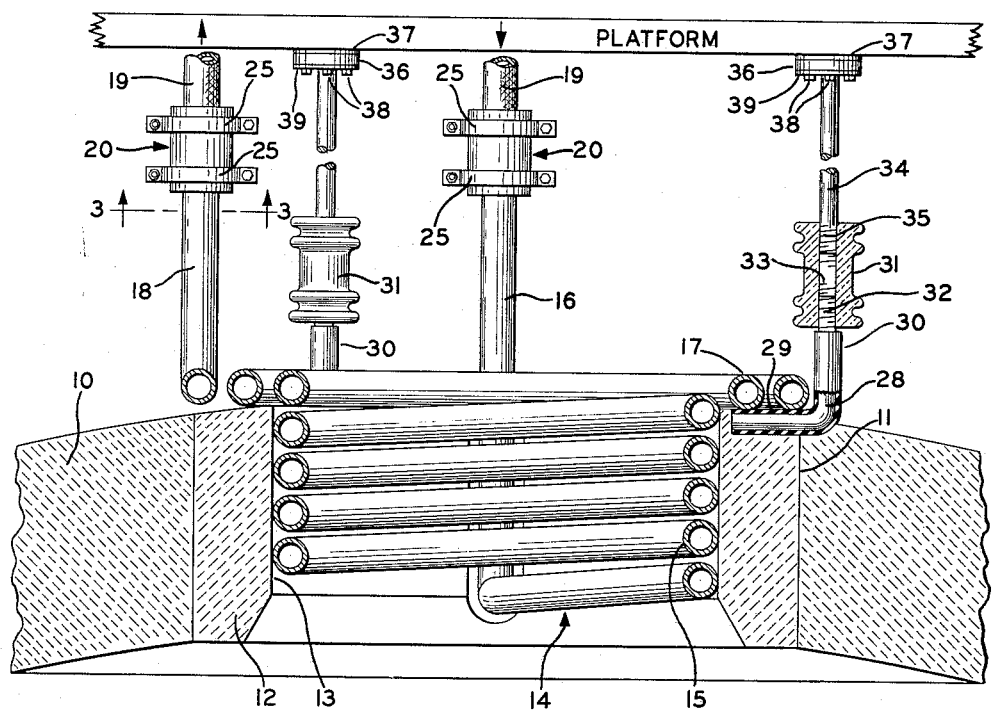

Sept. 20, 1955  F. A. BASLER  2,718,537
ELECTRODE GLAND
Filed Aug. 31, 1954

INVENTOR.
Fred A. Basler
BY Frease & Bishop
ATTORNEYS

United States Patent Office 2,718,537
Patented Sept. 20, 1955

2,718,537

ELECTRODE GLAND

Fred A. Basler, Canton, Ohio

Application August 31, 1954, Serial No. 453,398

6 Claims. (Cl. 13—17)

The invention relates to electrode glands, and more particularly to a gland for use on all types of electric furnaces wherein vertical electrodes are used as melting agents.

Under present electric furnace practice, where the electrodes pass through openings in the refractory roof of the furnace, it is customary to provide a water-cooled gland around the electrode within such opening, but such cooling glands as have been used in the past have not provided for satisfactory cooling of the furnace roof, and have not provided means for preventing possible explosion by falling of the cooling coils into the furnace due to collapse of the roof.

Such glands have permitted deterioration of the electrode arms and connectors, and have been difficult to replace, often requiring removal of the furnace roof in order to replace the glands.

It is therefore an object of the invention to provide an electrode gland which overcomes the above-mentioned disadvantages.

Another object is to provide an electrode gland adapted to cool the portions of the furnace roof surrounding the openings through which the electrode passes, so as to lengthen the life of the roof.

A further object is to provide such a gland in the form of a heat resisting steel tubing, coiled in helical form to fit within the opening in the furnace roof, with a flat spiral coil formed at the upper end of the helical coil and adapted to contact the furnace roof surrounding the opening, with means for passing water or other cooling agent therethrough.

A still further object is to provide means for connecting hose or the like to the inlet and outlet ends of the coiled tube in such a manner as to prevent the electric current from causing a short circuit or jump in current.

It is also an object of the invention to provide supporting hooks for the coiled tube, so as to prevent dropping of the coil into the furnace in the event that the furnace roof collapses, thus eliminating the possibility of an explosion.

Another object of the invention is to provide means for insulating the supporting hooks from the platform in which they are connected.

A further object is to provide such an electrode gland which may be more rapidly replaced and which does not require removal of the entire roof of the furnace for such replacement.

The above objects together with others which will be apparent from the drawing and following description, or which may be later referred to, may be attained by constructing the improved electrode gland in the manner hereinafter described in detail and illustrated in the accompanying drawing.

The invention may be stated in general terms as comprising an electrode gland comprising a heat resisting steel tubing, a portion of which is coiled in helical form to fit within the opening in the roof of the furnace, the adjacent end of the tubing extending upwardly and providing an inlet for water or other cooling agent, the remaining portion of the tubing being coiled in a flat spiral coil at the upper end of the helical coil and adapted to rest upon the roof of the furnace with the adjacent end of the coil extending upward providing an outlet for the cooling agent.

Supporting hooks are provided for supporting the cooling coil independently of the furnace roof, in event the roof collapses, these supporting hooks being suspended from the usual platform above such furnaces, means being provided for insulating these supporting hooks from the platform and from the coil, and insulating means are provided for connecting hose or the like to the inlet and outlet ends of the coiled tubing.

Figure 2:
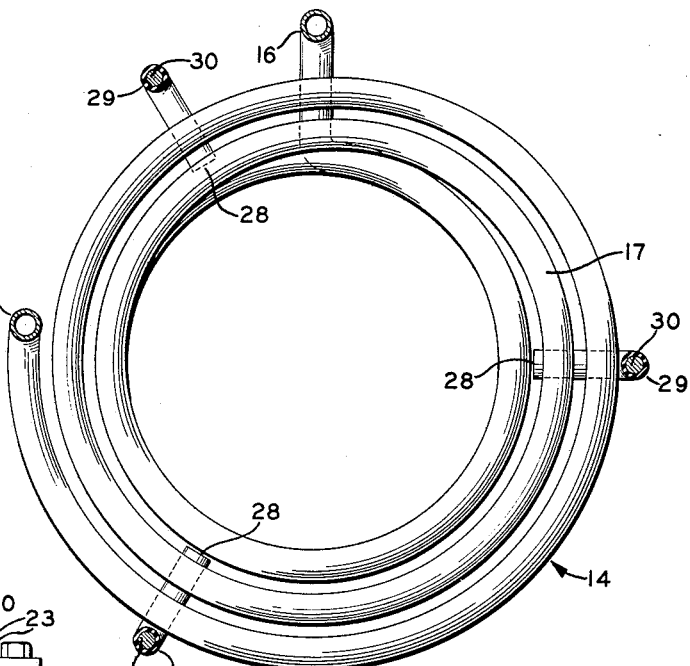
Figure 3:
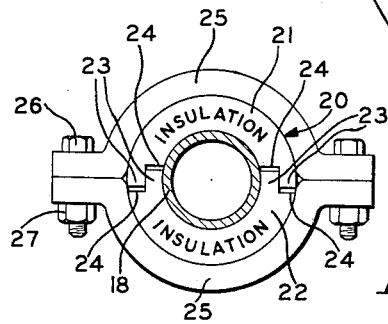

An embodiment of the invention is illustrated in the accompanying drawing, in which:

Fig. 1 is a vertical, sectional view of the improved electrode gland, showing the same mounted in position in a furnace roof;

Fig. 2 a top plan, sectional view of the cooling coil and supporting hooks thereof; and, Fig. 3 an enlarged sectional view, taken as on the line 3—3, Fig. 1, showing the insulation connection for connecting hose or the like to the inlet and outlet ends of the coiled tubing.

Referring now more particularly to the embodiment of the invention illustrated in the accompanying drawings, in which similar numerals refer to similar parts throughout, a portion of the refractory roof of an electric furnace is indicated at 10, having an opening 11 therein for receiving the tubular tile 12 having the opening 13 therein through which the electrode passes.

The improved electrode gland to which the invention pertains is formed of a suitable length of heat resisting steel tubing, indicated generally at 14, one portion of which is coiled in a helix indicated at 15, adapted to fit within the opening 13 in the furnace roof, the adjacent end portion of the tubing being extended upwardly as at 16 forming an inlet for water or other cooling agent.

The tubing is continued in a flat spiral coil 17, at the upper end of the helical portion, adapted to rest upon the top of the furnace roof, as shown in Fig. 1, the adjacent end portion of the tubing extending upward as at 18 providing an outlet for the cooling agent.

Sections of flexible hose, as indicated at 19 in Fig. 1, are connected to the inlet and outlet ends 16 and 18 respectively of the coiled tubing. For this purpose, connectors such as indicated generally at 20 are provided, formed of a suitable heat resisting material of sufficient resistance to allow for attachment of the hose 19 in such manner that there will be no leakage.

These connectors may be formed of a heat resisting resilient material, such as rubber, and are of sufficient length to permit of contraction or movement of the coils while providing proper connections to the hose.

Each of the connectors, indicated generally at 20, may be formed of two semi-tubular members, as indicated at 21 and 22 in Fig. 3, having interengaging, longitudinal ribs and grooves 23 and 24 respectively at their meeting faces.

The end portions of the steel tubing and the hose 19 are inserted into opposite ends of the assembled connector members 21 and 22, clamps 25 being tightly clamped around opposite end portions of the connectors, as by the bolts 26 and nuts 27.

Means is provided for supporting the coil independently of the furnace roof, so as to make it impossible for the coil to drop into the hot bath in the furnace, and thus cause an explosion, in event of the collapse of the furnace roof, as well as to assist in replacing the coil if defects occur therein.

Such means is shown as the supporting hooks 28, which may be insulated with rubber or mica covers 29. These hooks are radially arranged around the coil and located under the flat spiral portion 17 thereof, so as to independently support the coil while permitting the portion 17 thereof to rest upon the top of the furnace roof.

These hooks may be formed of steel tubes or rods, and the upright portions 30 thereof are connected to the lower ends of the porcelain insulators 31, as by the screw threaded upper ends 32 thereof engaged in the internal threads 33 in the insulators.

Straight tubes or rods 34 are connected to the upper ends of the insulators 31, as by the screw threaded lower ends 35 thereof engaged in the internal threads 33 of the insulators. It will be understood that the insulators 31 are capable of withstanding the voltage used in the electrodes.

A flange 36 is formed at the upper end of each tube or rod 34, for connection to the usual platform, an insulation gasket 37, of Micarta or the like, being interposed between said flange 36 and the platform. The bolts 38, which connect the flange 36 to the platform, should be located through Micarta sleeves (not shown) and the heads of the bolts should be insulated from the flange as by a Micarta gasket 39.

A forced stream of water, or other cooling agent, at a rate sufficient to cool the coil, is continuously passed through the coil, from the inlet end 16 to the discharge end 18 thereof, cooling the furnace roof surrounding the opening 13, as well as the top of the roof.

It will be evident that by the use of the improved electrode gland, the life of the furnace roof will be lengthened by preventing the electrode heat and furnace exhaust from causing deterioration of the roof refractories at the electrode entrances.

Furthermore, the improved gland will act to cool the electrode, thus eliminating the present cooling ring, and the cooling coil is so connected to the inlet and outlet that no electric current can in any manner cause a short circuit or a jump in current.

It will also be apparent that the supporting hooks will support the cooling coil independently of the furnace roof, thus eliminating any possibility of explosion by dropping of the coil into the furnace. And it will be seen that these supporting hooks are insulated from the cooling coil and from the furnace platform from which they are connected, so that a short circuit can in nowise be caused.

Also, with the construction disclosed herein the electrode gland may be replaced without removal of the furnace roof, and more rapid replacement is possible.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, means for passing a cooling agent through said coiled tubing, and means for supporting said coiled tubing independently of the furnace roof.

2. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, means for passing a cooling agent through said coiled tubing, means for supporting said coiled tubing independently of the furnace roof, and means for insulating said supporting means from the coiled tubing.

3. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, means for passing a cooling agent through said coiled tubing, supporting hooks engaged under said flat spiral coil for supporting said coiled tubing independently of the furnace roof, insulators connected to the upper ends of said hooks, and depending support members connected at their lower ends to said insulators.

4. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, means for passing a cooling agent through said coiled tubing, supporting hooks engaged under said flat spiral coil for supporting said coiled tubing independently of the furnace roof, insulators connected to the upper ends of said hooks, depending support members connected at their lower ends to said insulators, a platform above the furnace, flanges upon the upper ends of said depending support members, and means for connecting said flanges to the platform and for insulating the flanges from the platform.

5. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, opposite ends of the tubing being disposed upwardly and forming an inlet and an outlet therefor, flexible hose connected to the inlet and outlet, heat resisting material connectors connecting the hose to the inlet and outlet, said connectors being of sufficient resilience and sufficient length to provide fluid-tight joints and to compensate for expansion, contraction and movement of the coils, supporting hooks engaged under said flat spiral coil for supporting said coiled tubing independently of the furnace roof, insulators connected to the upper ends of said hooks, and depending support members connected at their lower ends to said insulators.

6. An electrode gland for electric furnaces having a refractory roof with an opening therein, said electrode gland comprising a tubing coiled in helical form to fit within said opening, the upper portion of the tubing forming a flat spiral coil adapted to rest upon the top of the furnace roof, opposite ends of the tubing being disposed upwardly and forming an inlet and an outlet therefor, flexible hose connected to the inlet and outlet, heat resisting material connectors connecting the hose to the inlet and outlet, said connectors being of sufficient resilience and sufficient length to provide fluid-tight joints and to compensate for expansion, contraction and movement of the coils, supporting hooks engaged under said flat spiral coil for supporting said coiled tubing independently of the furnace roof, insulators connected to the upper ends of said hooks, depending support members connected at their lower ends to said insulators, a platform above the furnace, flanges upon the upper ends of said depending support members, and means for connecting said flanges to the platform and for insulating the flanges from the platform.

References Cited in the file of this patent

UNITED STATES PATENTS

| Number | Name | Date |
|---|---|---|
| 1,518,416 | St. John | Dec. 9, 1924 |
| 2,389,033 | Dubsky | Nov. 13, 1945 |
| 2,693,498 | Penberthy | Nov. 2, 1954 |